United States Patent [19]

Yamamoto et al.

[11] 4,027,749
[45] June 7, 1977

[54] LATCH SPRING ASSEMBLY FOR DISC BRAKE PAD GUIDE PINS

[75] Inventors: Masachika Yamamoto, Toyonaka; Yasuhiko Taniuchi, Itami, both of Japan

[73] Assignee: Sumitomo Electric Industries, Ltd., Osaka, Japan

[22] Filed: Feb. 11, 1976

[21] Appl. No.: 657,025

[30] Foreign Application Priority Data

Feb. 13, 1975  Japan .................. 50-20330[U]

[52] U.S. Cl. ........................... 188/73.3; 188/73.6
[51] Int. Cl.² ................................. F16D 55/228
[58] Field of Search ............. 188/72.4, 72.5, 73.3, 188/73.5, 73.6; 267/159, 160

[56] References Cited

UNITED STATES PATENTS

| | | | |
|---|---|---|---|
| 3,243,017 | 3/1966 | Kleinstuck | 188/72.5 X |
| 3,522,866 | 8/1970 | Habersack | 188/73.6 |
| 3,545,575 | 12/1970 | Pinnhammer | 188/73.6 |

FOREIGN PATENTS OR APPLICATIONS

| | | | |
|---|---|---|---|
| 2,351,447 | 5/1974 | Germany | 188/73.5 |
| 2,024,102 | 12/1971 | Germany | 267/60 |
| 42,252 | 12/1971 | Japan | 188/73.5 |

*Primary Examiner*—George E. A. Halvosa
*Attorney, Agent, or Firm*—Carothers and Carothers

[57] ABSTRACT

A latch spring assembly for brake pad guide pins received in a disc brake caliper, such as the floating type as commonly utilized in automobile brake systems, wherein an opposed pair of disc brake pad members, which support friction pads in turn for engagement of opposite peripheral sides of a brake disc for braking, are retained between opposed caliper body walls on a pair of spaced guide pins which pass transversely through the pad members. The guide pins are latched in position for retention by a latch spring having outwardly extending legs with the ends thereof respectively received in or through the guide pins. A spring retention opening is provided through one of the opposed caliper body walls and the latch spring is provided with a central hook which extends through and hooks this retention opening under spring tension. In addition, a portion of each of the two spring legs engages the caliper body under tension relative to the central hook of the spring in order to retain the spring ends stationary with respect to the axial direction of movement of the guide pins which are received in the caliper body. The guide pins are thus prevented from falling out and are held stationary with respect to their axial direction of displacement by the free end of the spring legs, at least within the limits of flexural elasticity of the spring legs. This latch spring assembly permits one or both of the pins to be provided without the conventional pin head at one end of the guide pin, and places it remote from moving and wearing brake parts.

4 Claims, 4 Drawing Figures

4,027,749

LATCH SPRING ASSEMBLY FOR DISC BRAKE PAD GUIDE PINS

BACKGROUND OF THE INVENTION

1. Field of Invention

This invention relates generally to the field of latch spring assemblies for the retention of a plurality of assembled structural elements and more particularly to spring wire latch assemblies for the retention of guide pin received in a disc brake caliper for guiding and supporting an opposed pair of disc brake pad members which support opposed friction pads for engagement of opposite peripheral sides or faces of a vehicle brake disc.

2. Description of the Prior Art

In conventional disc brake assemblies which incorporate disc brake calipers to the floating type in vehicle braking systems, the floating caliper, which is mounted stationary with respect to the vehicle, straddles a braking disc periphery which rotates with the vehicle wheel. A pair of disc brake pad members, which consist of backup plates with attached brake friction pads that respectively face each other on opposite peripheral side faces of the brake disc for respective frictional braking engagement, are retained between opposed caliper walls of the caliper body by means of a pair of spaced guide pins which pass transversely through the pad members. One or both of the brake pad members are thus permitted to slide toward each other on the guide pins for frictional engagement with the peripheral sides of the brake discs and to slide away from each other for disengagement of the brakes. Generally, either one or both of the pad members are permitted to freely slide on the guide pins depending respectively whether only one of the pad members is to be engaged and moved by a brake piston or both pad members are so engaged and simultaneously moved for braking engagement with the disc by respective brake pistons.

These guide pins generally pass through opposed walls of the caliper body at the end portion of the pin and one end of each guide pin is provided with an enlarged pin head to engage the outside of the caliper body in order to prevent the pin from sliding clear through the respective retention hole in the caliper body. These guide pins are then retained in their assembled position to prevent accidental dislodgement by means of one or two latch springs (usually formed of stainless steel or steel spring wire) which diametrically pass through openings or in recesses in the pins.

However, these latch spring assemblies of the prior art are deficient in that some of the latch springs are difficult to position in assembled form, others rely strictly on the provision of a guide pin head at the end of each guide pin to assist in maintaining the guide pin assembly, still other single latch spring assemblies, wherein one latch spring is utilized to retain both guide pins, are such that if one leg of the latch spring breaks, both guide pins may be dislodged due to wheel vibration and applied braking friction, or yet still others are such that the latching pin or pins are engaged with or adjacent the backup plates of the two friction pad members such that retention of the guide pins is endangered by or associated with wear or excessive wear of the friction pads.

It is the principle object of the present invention to eliminate these deficiencies of the prior art floating disc brake assemblies while simultaneously providing an assembly which is more economically manufactured and more readily assembled and disassembled.

SUMMARY OF THE INVENTION

The latch spring assembly of the present invention for retaining brake pad guide pins received in a disc brake caliper comprises an opposed pair of disc brake pad members which are retained between opposed caliper body walls of the disc brake caliper on a pair of space guide pins that pass transversely through the pad members and the guide pins are latched for retention by a latch spring having outwardly extending legs with the ends thereof respectively received in the guide pins such as by a hole diametrically passing through the pins or by a retention recess in the pins. The improvement in the latch spring assembly of the present invention comprises a spring retention opening which passes through one of the opposed caliper body walls and the latch spring is provided with a central hook which extends through this opening and actually hooks the opening under spring tension. A portion of the two spring legs engage the caliper body under tension relative to or against the hook so that the latch spring is self secured under spring tension to the caliper body itself without reference to the axial displacement of the guide pins in the caliper body. This arrangement retains the two spring ends stationary relative to the axial direction of the placement of the guide pins within, of course, the flexural elasticity limits of the spring legs. The result is that the guide pins are retained against axial displacement in the transverse holes in the caliper body within which the pins rest regardless of whether or not the guide pins are provided with a pin head at one end as is normally done in the prior art to prevent axial displacement of the guide pin is one direction. While such guide pins without pin heads are permitted to slide axially in the caliper body mounting hole within the lateral flexural elasticity limits of the spring legs, this minute range of possible axial movement of the guide pins under flexure of the spring legs is insufficient to permit complete dislodgment of the pins even though they may be provided without heads.

In addition, the latch spring legs preferably extend generally outward in opposite directions from the central hook and are bent in their mid portion such that the ends of the legs project in a direction generally opposite to that of the free end of the hook. In addition, the legs are further bent such that the mid portions thereof are the closest portions of the legs to an imaginary plane passing through the free end of the hook, assuming the imaginary plane is in addition parallel to the line of general extension of the legs such that the latch spring engages opposite side faces of the caliper body about the spring retention opening under tension. The inside of the free end of the hook presses against one side of the caliper body and the bent mid portions of the latch spring legs press against the opposite side of the caliper body portion through which the retention opening passes.

In addition, it is also preferable that the latch spring legs are positioned on the opposite side of the caliper body wall portions through which the retention opening passes from the brake pad members so that the moveable and wearing brake part members cannot possibly interfere detrimentally with the securement of the latch spring.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1a is a plan view of the latch spring utilized in the assembly of the present invention.

FIG. 1b is a view in side elevation of the latch spring illustrated in FIG. 1a.

FIG. 3 is a front view in side elevation of the disc brake assembly illustrated in FIG. 2.

DESCRIPTION OF THE PREFERRED EMBODIMENT

Figure 1:
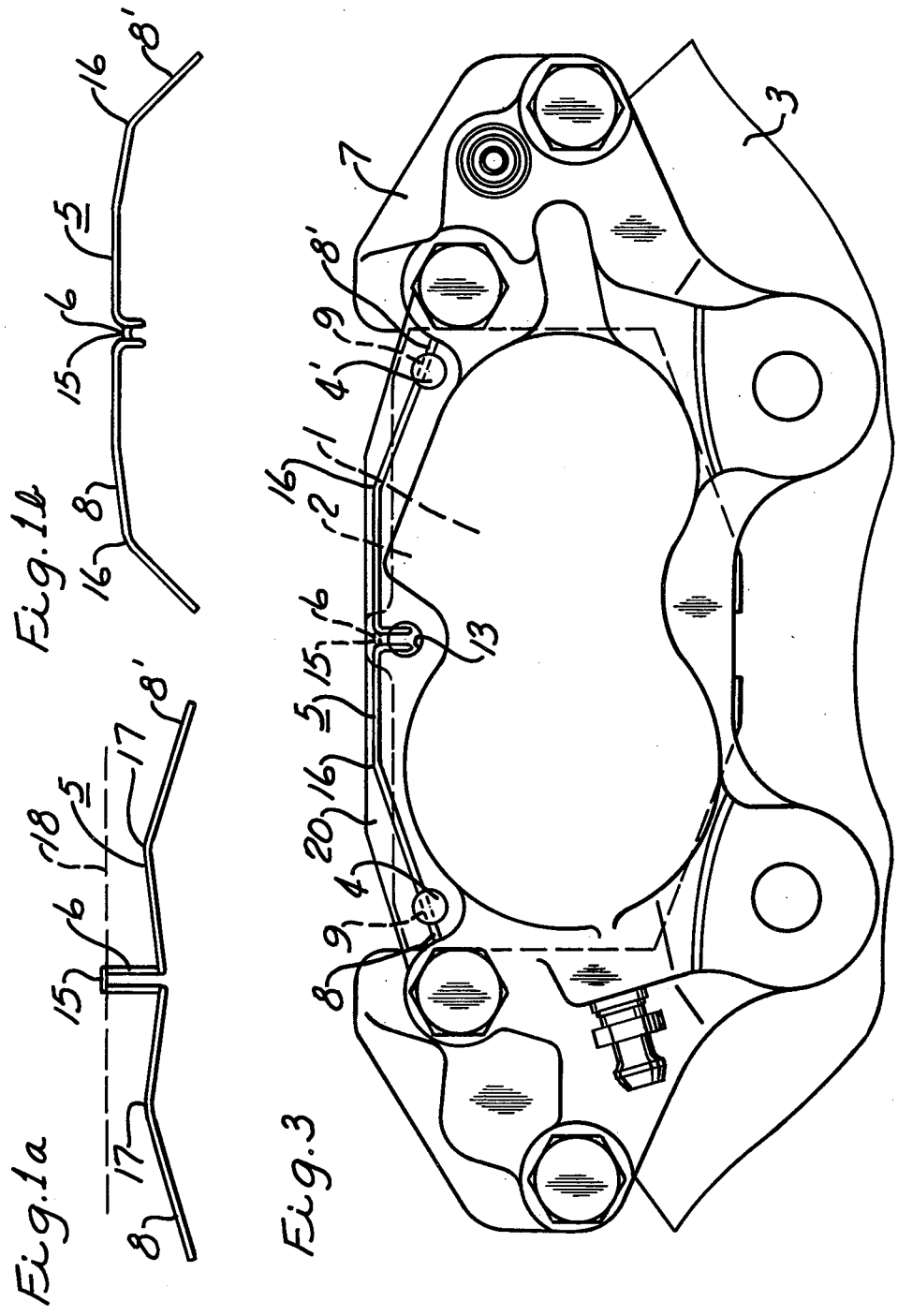

Referring to the drawings, latch spring 5 retains the two guide pins 4 and 4' in position relative to the disc brake caliper 7 in a simple yet dependable manner. Latch spring 5 consists of two symmetrically opposed spring legs 8 and 8' which extend generally outward in opposite directions from central hook 6 which is formed by a bending or stamping operation. Latch spring 5 is thus one continuous spring wire of stainless steel or steel, or any other suitable spring wire material, as best illustrated in FIGS. 1a and 1b.

Hook 6 is defined herein as terminating at its free end 15. The legs 8 and 8' of latch spring 5 are also defined or described as being bent as indicated at 16 in ther mid portions such that the free end of the legs project in a direction generally opposite to that of the free end 15 of hook 6, as illustrated in FIG. 1b. Legs 8 and 8' are further bent in their mid portions as indicated at 17 in FIG. 1a such that these mid portions 17 are the closest portions of the legs 8 and 8' to an imaginary plane 18 which passes through the free end 15 of hook 6 and generally extends in parallel to legs 8 and 8'. This configuration of latch spring 5 provides several novel advantages which will hereinafter be described.

Figure 2:
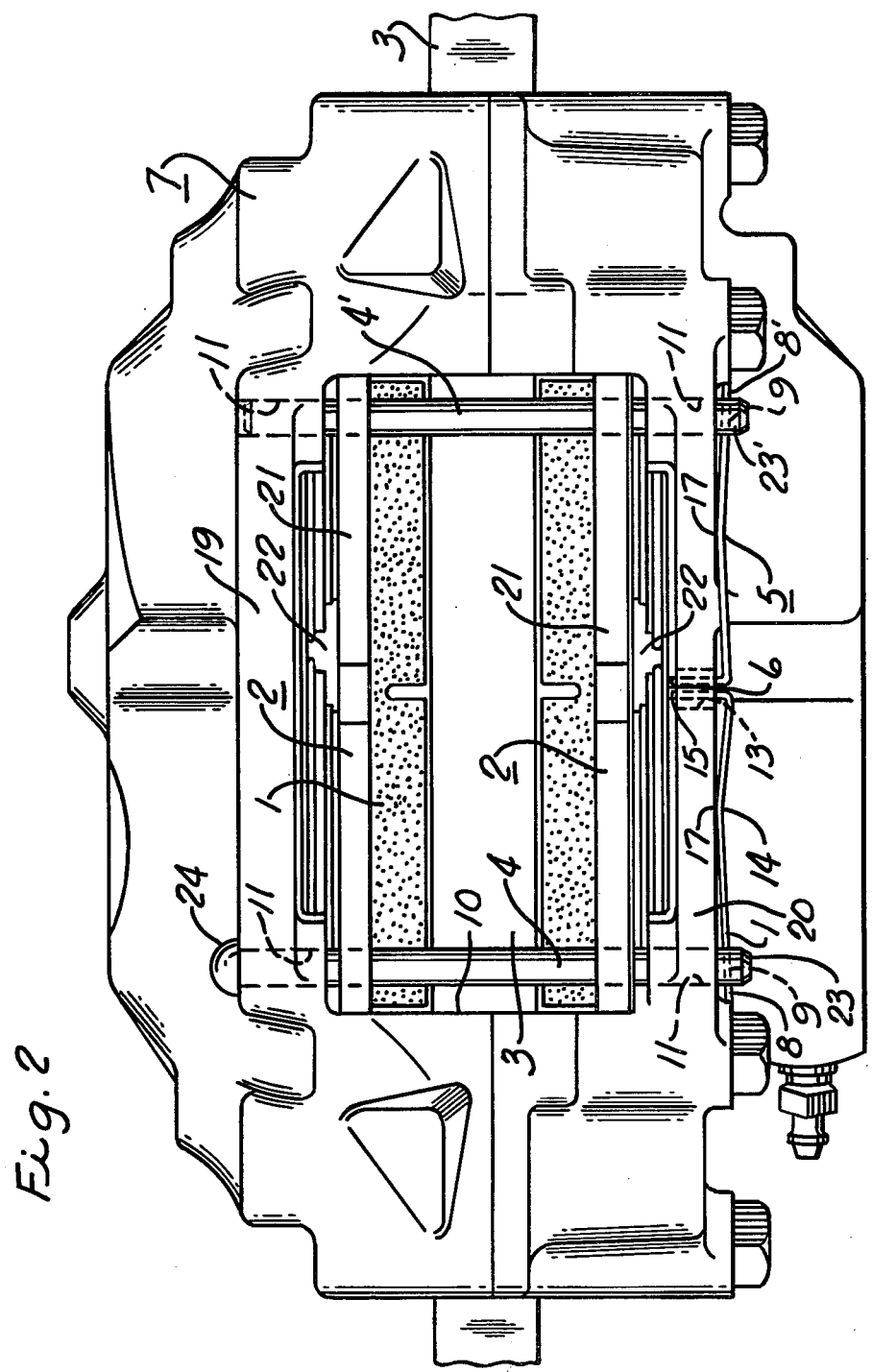
FIG. 2 is a plan view of a floating type disc brake assembly illustrating the latch spring assembly of the present invention.

Referring specifically to FIGS. 2 and 3, the disc brake assembly illustrated generally consists of disc brake caliper 7 which retains opposed brake pad members 2 between opposed caliper body walls 19 and 20 by means of guide pins 4 and 4' which are received at opposite ends in guide pin holes or openings 11 in the side wall portions 19 and 20. These side wall portions generally define opposed boundries of a window or opening 10, through which brake pad members 2, which consist of backup plate 21 and attached brake friction pad 1, may be passed for insertion or replacement after removal of guide pins 4 and 4'.

Disc brake caliper 7 straddles a peripheral portion of circular brake disc 3 thus positioning friction pads 1 on opposite peripheral side faces of brake disc 3 for frictional braking engagement therewith when opposed dual brake pistons 22 are actuated by the vehicle brake to move inwardly toward each other against the outside back surfaces of backup plates 21.

Caliper body wall 20 is provided with spring retention opening 13 which passes therethrough midway between opening 11 in the same wall portion. Central hook 6 extends through opening 13 and hooks the wall in which the opening is formed under spring tension as the free end of legs 8 and 8' are received through openings 9 which diametrically pass through the exposed ends 23 and 23' of pins 4 and 4' respectively. Thus as viewed from FIG. 3, the configuration of latch spring 5 is such that legs 8 and 8' are continually under spring tension so as to urge hook 6 upwardly as viewed in the Figure to seat the opening within hook 6.

In addition, the portions 17 of the spring legs as illustrated in FIG. 2, engage the caliper body under tension relative to hook 6 to retain the free end of spring legs 8 and 8' respectively stationary relative to the axial direction of guide pins 4 and 4', within, of course, the flexural elasticity limits of the spring legs. It is thus seen in FIG. 2 that latch spring 5 engages opposite sides of the caliper body wall 21 under tension. The inside face of hook free end 15 is continually contacting one side face of caliper wall portion 21 adjacent retention opening 13 and portions 17 of legs 8 and 8' are simultaneously engaging the opposite face of caliper wall 21 under spring tension so that the free ends of spring legs 8 and 8' are retained stationary relative to the axial direction of pins 4 and 4'. In view of this fact, it is not necessary to provide guide pins 4 and 4' with the conventional pin head 24 as illustrated in FIG. 2, as pins 4 and 4' will remain axially positioned by the free ends of spring legs 8 and 8'. Guide pin 4' is illustrated without such a pin head. This permits more working room about the crowded parts of the disc brake caliper and also renders the structure less expensive for manufacturing purposes.

In addition, the configuration of latch spring 5 also permits easy installation thereof in the assembly. The free ends of legs 8 and 8' of spring 5 are inserted respectively into transverse holes or openings 9 and then the hook portion 6 is pressed downwardly as seen from the view in FIG. 3 until free end 6 is aligned with retention opening 13, and at this point in time hook 6 is also pushed inwardly as viewed in FIG. 3 so that free end 15 passes all the way through retention opening 13. When latch spring 5 is then subsequently released, its natural configurations cause it to hook the opening 13 under spring tension such that hook 16 is continually urged in the upward direction as viewed in FIG. 3 while simultaneously being continually urged by its spring tendencies so that the inside of free end 15 presses against the inside face of caliper wall portion 21 adjacent retention opening 13. In short, the reactive force of the bent portions of latch spring 5 cause it to seat in pressing contact with wall 21 to retain the free end of legs 8 and 8' stationary with respect to the axial direction of pins 4 and 4'.

In addition, it should be noted that latch spring legs 8 and 8' are positioned on the opposite side of caliper wall 20 from brake pad members 2 such that the safety of the latch spring assembly cannot be affected by the moving and wearing parts of the disc brake caliper.

We claim:

1. A latch spring assembly for brake pad guide pins received in a disc brake caliper including an opposed pair of disc brake pad members retained between opposed caliper body walls of a disc brake caliper on a pair of spaced guide pins passing transversely through the pad members and latched for retention by a latch spring having outwardly extending legs with the ends thereof respectively received in said pins, the improvement comprising a spring retention opening through one of said opposed caliper body walls, said latch spring having a central hook extending through said opening and hooking said one wall under spring tension, a mid portion of each of said spring legs engaging said caliper body under tension relative to said hook to retain said spring ends stationary relative to the axial direction of said pins within the flexural elasticity limits of said spring legs, said legs extending generally outward in opposite directions from said hook for their entire length.

2. The latch spring assembly of claim 1 wherein the opposite ends of each of said pins are respectively received in opposed openings through said opposed caliper body walls, at least one of said pins being provided without a pin head.

3. The latch spring assembly of claim 1 wherein said latch spring legs are bent in their mid portions such that the ends of said legs project in a direction generally opposite to that of the free end of said hook and further such that the mid portions of said legs are the closest portions thereof to a plane passing through the free end of said hook and in parallel to said legs to thereby engage under tension opposite side faces of said caliper body about said retention opening by the inside of the free end of said hook and the mid portions of said legs respectively.

4. The latch spring assembly of claim 1 wherein said latch springs legs are positioned on the opposite side of said one of said opposed caliper body walls from said pad members.

* * * * *